Nov. 6, 1962 E. K. FITCH, JR 3,062,054
SPRING RATE COMPENSATED TRANSDUCER
Filed March 7, 1957

INVENTOR.
Eugene Kemper Fitch Jr.
BY John C McGregor,
his attorney

United States Patent Office 3,062,054
Patented Nov. 6, 1962

3,062,054
SPRING RATE COMPENSATED TRANSDUCER
Eugene Kemper Fitch, Jr., Charlottesville, Va., assignor to Specialties, Inc., Syosset, N.Y., a corporation of New York
Filed Mar. 7, 1957, Ser. No. 644,654
9 Claims. (Cl. 73—410)

This invention relates to sensing transducer assemblies and more particularly to sensing assemblies responsive to extremely small changes in the measured variable.

In many types of instruments which measure or control a variable, such for example as pressure, there is need for an output motion which varies as a function of the variable. These output motions are derived from sensing devices, usually of the deformable type, such as bellows, diaphragms or the like. In those cases in which the range of the variable is large and in which extreme sensitivity is not required, conventional sensing devices are adequate. In other cases, however, a measurable response must be obtained with extremely small changes in the measured variable. This is particularly true in the case of servos which, as zero-seeking systems, strive to maintain a balance of forces in accordance with signals from a sensing device.

The ultimate sensitivity of sensing devices is often limited by their inherent spring rate. Small changes in the variable are unable to produce a usable output motion because of the rapid increase in the spring forces as deformation occurs.

In accordance with the present invention, therefore, there is provided a sensing assembly affording increased output motion for relatively small changes in the variable being sensed. Stated otherwise, a required output motion can be obtained with a much smaller change in the variable. In accordance with the invention, the sensing assembly, including an output portion movable as a function of the variable and resilient portion influencing the position of the output portion and imposing forces of resilience thereon, is arranged with magnetic means exerting forces on the output portion which offset the forces imposed by the resilient portion. Preferably, the assembly is so arranged that the magnetic forces minimize the forces of resilience within a given range of movement. In this fashion a required output motion of the assembly can be achieved with extremely small changes of the variable.

Representative embodiments of the invention from which the above and other features and advantages of the invention will be apparent are described below having reference to the accompanying drawing in which.

Figure 1:
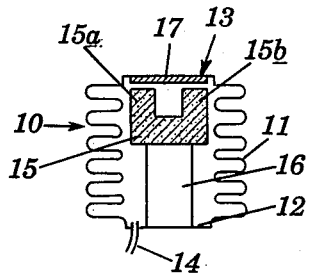
FIGURE 1 is a view in vertical section and diagrammatic in nature of a sensing assembly in which the sensing element takes the form of a conventional bellows within which structure of the present invention is enclosed.

Referring to FIGURE 1, the invention is illustrated as embodied in an assembly indicated generally by the numeral 10 and including a sensing element in the form of a bellows 11 having a base portion 12 on which it can be supported and an output portion 13 adapted to partake of output motion in accordance with the variable being sensed, in this case fluid pressure introduced into the bellows by means of an inlet conduit 14. Disposed within the sensing element 11 and completely obscured thereby is a first magnetic portion 15 carried by a support 16 secured to the base 12. The magnet 15 can take the form of a permanent magnet of a suitable magnetic material, such as Alnico V, with its opposite poles 15a and 15b disposed in a common plane closely adjacent the output portion 13. The output portion 13 carries, for movement therewith, a second magnetic portion 17. The second magnetic portion 17 can take the form of a slug of ferromagnetic material which is attracted to the first magnetic portion 15. The first and second magnetic portions 15 and 17 are so constituted and so mounted that the forces of magnetic attraction are approximately equal to and therefore substantially offset the inherent forces of resilience of the sensing element 11 so that the magnetic force cancels out the inherent spring rate.

The assembly described above is adapted to operate with a variable in the form of a decreasing fluid pressure applied to the sensing element 11 through the conduit 14. As the resilient or spring forces of the element 11 come into play in increasing magnitude with increasing motion or travel of the output portion 13, the compensating or offsetting forces of the magnetic system increase at approximately the same rate as the distance between the magnetic portions 15 and 17 decreases. In this fashion the detrimental effect of the increasing resilient forces is partially overcome over the entire range of motion. If additional compensation is required, it will be understood that both magnetic portions 15 and 17 can take the form of magnetized members, polarized to attract.

Figure 2:
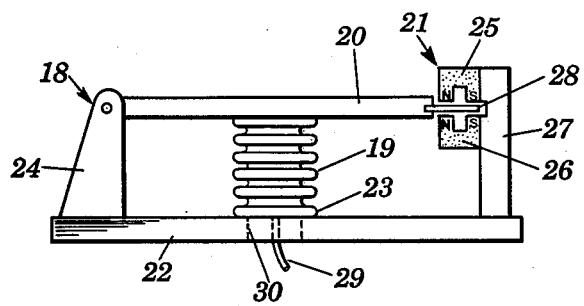
FIGURE 2 is a view in side elevation, partly in vertical section and diagrammatic in nature, of a sensing assembly representing a modification of that shown in FIGURE 1.

Referring to FIGURE 2, there is shown a sensing assembly indicated generally by the numeral 18 in which the forces from a magnetic compensating assembly 21 are applied through linkage in the form of a lever 20 to deformable means in the form of a pressure-sensitive bellows 19. The mechanical advantage of the lever 20 can be made to benefit either the sensing element 19, or, as shown, the magnetic compensating assembly 21. To this end the assembly 18 includes a support 22 to which the base 23 of the sensing element is attached, and an upstanding arm 24 to which is pivoted the output member as represented by the lever 20, the sensing element 19 engaging the lever between its ends and the magnetic compensating assembly operating at the free end of the lever.

In the illustrated arrangement, the magnetic compensating assembly 21 is double acting, including a pair of magnetic portions 25 and 26 each secured to a common support 27 carried in turn by the support 22. Disposed between the magnets 25 and 26 is a ferromagnetic portion or slug 28 secured in cantilever fashion to the free end of the lever 20 and preferably formed of a material having a low residual magnetism, such for example as soft iron. The magnets 25 and 26 are arranged so that their north and south poles oppose each other across gaps traversed by the armature portion 28, the flux from the north pole of the magnet 25 flowing into the armature 28 and along its length where it can divide between either of the south poles of the magnets 25 and 26, and the flux from the north pole of the magnet 26 following a similar pattern.

In operation, a variable represented by fluid pressure introduced into the sensing element 19 via the conduit 29 will cause the element either to expand or contract depending upon the direction of the pressure change. Assuming the armature 28 to be initially disposed midway between the gaps divided by the magnets 25 and 26, the pressure change in the element 19 will urge the armature toward one or the other of the magnets. Immediately the balance of flux densities in the gaps between the armature and the respective magnets changes, increasing in the gaps in the direction of motion of the armature and decreasing in other gaps. This differential imposes a differential biasing force on the armature in the direction of movement of the sensing element 19. By appropriate selection and mounting of the several elements, the net magnetic forces can be made to approximately offset the spring force imposed by the resilient portions of the sensing element 19 regardless of the direction of motion of the output member 20 in response to deformation of the element 19. The sensing element 19 can be shifted lengthwise of the lever arm 20 to adjust the mechanical advantage of the system. In this fashion the same basic structure can be made to accommodate sensing elements having a relatively wide range of spring constants and magnetic compensating assemblies having a relatively wide range of flux intensities. To accommodate movement of the sensing element 19, the support 22 is formed with a slot 30 to receive the energizing conduit 29.

Figure 2A:
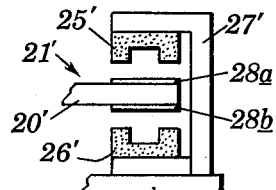
FIGURE 2A is a fragmentary view in side elevation of a modification of a portion of the sensing assembly of FIGURE 2.

Referring to FIGURE 2A, there is shown a modification of the arrangement of FIGURE 2 in which like parts are identified by like primed reference characters. The output member or lever 20' is extended in length to pass between the gaps between the pole pieces of the magnets 25' and 26'. Disposed on opposite sides of the free end of the lever 25 are armature portions 28a and 28b, in the form of ferromagnetic slugs, the former being of a length sufficient to bridge the gap between the pole pieces of the magnet 25' and the latter to bridge the distance between the pole pieces of the magnet 26'. By means of this armature construction, it is not necessary that the polarity of the magnets 25' and 26' bear any particular relationship to each other.

Figure 3:
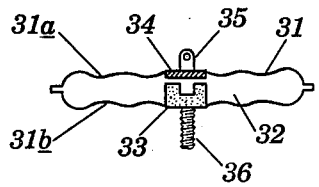
FIGURE 3 is a view in vertical section, also diagrammatic in nature, showing a sensing assembly utilizing a diaphragm or capsule as the activating element.

Referring to FIGURE 3, the invention is illustrated as embodied in an assembly in which the deformable output member is in the form of a diaphragm or capsule 31 comprising corrugated upper and lower surfaces 31a and 31b joined at their perimeters to define a closed internal space 32. Within the space 32 and joined to the lower surface 31b is a magnet 33 having its poles facing a magnetic portion 34 secured to and movable with the upper surface 31a, the magnetic portion 34 taking the form of a ferromagnetic slug under the attraction of the magnet 33 joined to the upper surface 31a. Preferably adjacent the magnetic portion 34 is an output connector 35 and secured to the lower surface 31b, preferably adjacent the magnet 33, is a mounting support 36.

In operation, the sensing element 31 is subjected to a differential pressure, representing the variable. This differential pressure can be applied by means of a suitable pressure conduit (not shown) leading to the space 32 within the element, or it can be applied by means of pressure changes applied externally. In the illustrated arrangement, the assembly is responsive either to decreased internal pressures or increased external pressures, or a combination of both, wherein the sensing element is collapsed against its inherent spring forces, resulting from the corrugated top and bottom surfaces 31a and 31b and assisted by the attraction of the complementary magnetic portions 33 and 34. As in the preceding arrangements, the magnetic and resilient forces are made to offset themselves over the range of output motion derived from the assembly.

Figure 4:
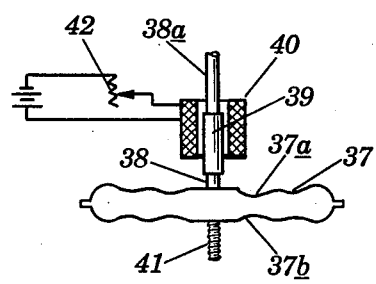
FIGURE 4 is a view in side elevation, also diagrammatic in nature, of a modification of the arrangement of FIGURE 3.

In each of the assemblies described above, permanent magnets are used. It is to be understood, however, that the invention is not limited to the use of permanent magnets but that electromagnets can also be used. For purposes of illustration, an assembly using an electromagnet is shown in FIGURE 4. The assembly of FIGURE 4 includes a sensing element 37 which can take the same general form as the sensing element 31 of FIGURE 3 or, if desired, of the sensing elements 11 and 19 of the FIGURES 1 and 2. Connected to the upper surface 37a of the sensing element for movement therewith is a link 38 carrying a magnetic corepiece 39 of soft iron, for example, received within a coil 40 for limited axial movement. As an output connector, an extension 38a can be provided at the upper end of the link 38. The lower surface 37b of the element 37 has attached at its center a mounting support 41. In operation, the element 37 is deformed by the application of a pressure differential between its inner and outer surfaces causing the element to expand against the inherent spring forces of its corrugated surfaces to displace the output connector 38a. With a suitable energizing potential impressed on the coil 40, applied through potential adjusting means 42, the core 39 has a bias or force imposed thereon which offsets the resilience of the element 37 so that the assembly is highly sensitive to the variable, that is an output motion is derived in response to relatively small changes in pressure.

Figure 5:
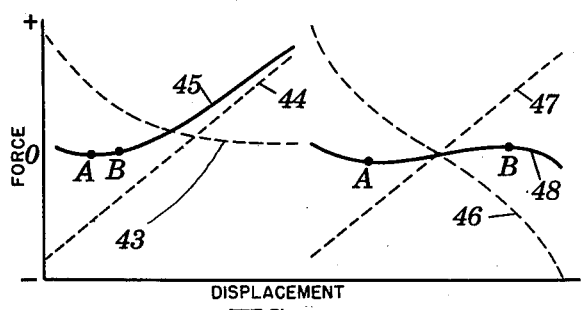
FIGURE 5 is a graph showing curves of force plotted against displacement based on sensing elements of FIGURES 1 and 2A.

Referring now to FIGURE 5, there is shown a graph illustrating the action of both single and double magnet systems in accordance with the present invention. In the graph in which force is plotted against displacement, the curve 43 represents the force-displacement relationship between an armature and a single magnet, while the curve 44 represents the force-displacement relationship of a typical bellows or diaphragm. It will be observed that zero force occurs approximately midway in the straight line curve 44, this representing the point at which no force is acting on the bellows. In the curve 43 it will be observed that the relationship is not linear, but that the force increases at a faster rate as the armature approaches the magnet. It should also be noted that the average slope of the curve 43 is opposite to that of the curve 44, indicating that the magnet-armature combination has, in effect, a negative spring rate. The force is always positive and approaches zero asymptotically.

The curve 45 represents the sum of the curves 43 and 44. The right-hand end of the curve 45 shows a positive slope approximately that of the original bellows, and, it follows, there is virtually no improvement in performance to be had in operating the single magnet systems of FIGURES 1, 3 and 4, for example, on this part of the curve. At the left-hand end of the curve 45 there is exhibited a negative spring rate which is reflected in a working system in the form of instability. Between the points A and B, the slope of the curve is substantially zero, representing stable conditions. By operating the system in this vicinity, improved performance is obtained.

Generally speaking, however, operation of a single magnet system, such as that of FIGURES 1, 3 and 4, results in a continuous bias by the magnet on the bellows, meaning that the bellows is never at rest, but is stressed at all points in the operating range. The system of FIGURES 2 and 2A, however, overcomes these inherent disadvantages. Referring to the graph, the curve 46 is a typical curve produced by the combined forces of two substantially equal magnets such, for example, as the magnets 25' and 26'. The curve 47 represents the force-displacement relationship of the bellows and is, of course, substantially the same as the curve 44. The curve 48 shows the sum of the magnetic forces and the bellows forces. On this curve, the portion between the points A and B is representative of stable conditions, the spring rate of the bellows being minimized, thereby giving increased sensitivity to small pressure differentials. By suitable selection of components and force levels, practical sensitivity gains up to twenty are obtainable. Under laboratory conditions, gains as high as fifty can be demonstrated.

In each of the foregoing assemblies, the sensing elements take the form of bellows or diaphragms. For most purposes, these elements are metallic, thereby imposing their own spring or resilient forces on the system. Experiments have indicated that the sensitivity of a metallic bellows assembly in accordance with the present invention can be increased by a factor of twenty within small, but usable, ranges of motion. By the use of magnetic forces applied to the moving parts, inertia loads are kept to a minimum. While the variable to which each of the assemblies described above responds is represented by fluid pressure, it will be understood that the assemblies can be made to respond to temperature, or to other variables, with appropriate changes in the design of the sensing elements. The invention should not therefore be regarded as limited except as defined by the following claims.

I claim:

1. A spring rate compensated transducer assembly for affording an output motion in response to a variable comprising a sensing device including resilient, closed vessel means deformable as a function of the variable and having a predetermined spring rate, an output portion movable with the deformable means, said resilient means opposing the output motion of the output portion; first magnetic means movable with the output portion and second magnetic means complementary thereto to impose forces on the output portion and deformable resilient means in directions countering the forces of resilience imposed by said resilient means in the direction of output motion, said magnetic means being disposed in attracting relationship and relatively movable to afford increasing countering forces with increasing travel of the output portion; and means to introduce to said deformable resilient means values representing the variable, whereby output motions are attainable with relatively small changes in the variable by the application of the magnetic forces of said first and second magnetic means in a direction which effectively reduces the spring rate of said resilient means, said magnetic means comprising first magnetic means secured to the movable portion of said closed vessel and second magnetic means concealed within said vessel.

2. A spring rate compensated transducer assembly for affording an output motion in response to a variable, comprising, a sensing device including resilient means deformable as a function of the variable and having a predetermined spring rate, and an output portion movable with the deformable means, said resilient means opposing the output motion of the output portion, first magnetic means movable with the output portion and second magnetic means complementary thereto to impose forces on the output portion and resilient means in directions countering the forces of resilience imposed by said resilient means in the direction of output motion, said magnetic means being disposed in attracting relationship and relatively movable with respect to each other to afford increasing countering forces with increasing travel of the output portion, and means to impart values representing the variable to said resilient means whereby output motions are attainable with relatively small changes in the variable by the application of the magnetic forces of said first and second magnetic means in a direction which effectively reduces the spring rate of said resilient means, said first magnetic means being movable in at least two different directions with said deformable resilient means in response to increase and decrease, respectively, of said variable, said second magnetic means comprising two magnetic portions in attracting relation with said first magnetic means respectively in said two directions.

3. An assembly as set forth in claim 2, said first magnetic portion comprising a ferromagnetic armature including a pair of ferromagnetic slugs disposed on opposite sides of the armature, said two portions of the second magnetic means being disposed respectively on opposite sides of the armature in working relationship, respectively, with the two ferromagnetic slugs, the armature normally being disposed between the poles of the two magnetic portions with air gaps in between, whereby motion of said deformable means shortens the gaps to one magnetic portion and lengthens the gaps to the other to establish a differential magnetic pull on the armature and hence on said deformable resilient member in its direction of deformation in response to the variable.

4. An assembly as set forth in claim 2, said first magnetic portion comprising a ferromagnetic armature, said two portions of said second magnetic means being disposed respectively on opposite sides of the armature and each portion comprising a magnet having its north and south poles disposed adjacent said armature to establish a flux path through the armature, the armature normally being disposed between the poles of the two magnetic portions with air gaps therebetween, whereby motion of said deformable resilient means shortens the gaps to one magnetic portion and lengthens the gaps to the other to establish a differential magnetic pull on the armature and hence on said deformable resilient member in its direction deformation in response to the variable.

5. An assembly as set forth in claim 4, said two magnetic portions on opposite sides of said armature being arranged with their north poles opposing each other across the armature and with their south poles opposing each other across the armature, whereby substantially all of the generated flux passes along the length of the armature between opposite poles.

6. In a bellows including resilient wall means, a cap portion and a base portion, and first and second complementary magnetic parts supported respectively by said cap portion and by said base portion to impose forces on the bellows opposing the spring rate on the bellows for at least one direction of motion thereof, said second complementary magnetic part being secured to said cap portion within said bellows, said magnetic parts imposing forces on the bellows in the direction of movement thereof to offset the spring rate thereof.

7. In a bellows including resilient wall means, a cap portion and a base portion, a magnetic element mounted within said bellows on said base portion, and a magnetic element attached to said cap portion within said bellows and situated adjacent at least one of the poles of the magnet, said magnetic elements being arranged to impart forces on said bellows offsetting the spring rate thereof.

8. In a bellows assembly, a bellows, a base member supporting said bellows, an elongated member pivotally supported by the base member and coupled to the bellows to move therewith, a first magnetic element carried by said elongated member and a second magnetic element supported by said base member adjacent said first magnetic element to urge the elongated member in one direction of pivotal movement, and a third magnetic element supported by the base member adjacent the first magnetic element to urge the elongated member in the other direction of pivotal movement, thereby to render the elongated member substantially free of the influence of the spring rate of the bellows.

9. A spring rate compensated transducer assembly comprising a resiliently supported output member movable as a function of a variable and having a predetermined spring rate, said output member being normally centrally positioned and movable selectively in either of two opposite directions, and magnetic means to apply forces to said member to overcome the influence of the spring rate over a predetermined range of movement, said magnetic means including a pair of magnets positioned on opposite sides of the member to urge the member in opposite directions to afford substantially zero spring rate effect over a predetermined range of motion.

References Cited in the file of this patent

UNITED STATES PATENTS

| | | | |
|---|---|---|---|
| 1,933,327 | Hoare | Oct. 31, | 1933 |
| 2,066,942 | Massa | Jan. 5, | 1937 |
| 2,223,640 | Rineer | Dec. 3, | 1940 |
| 2,350,741 | Ford | June 6, | 1944 |
| 2,413,203 | Weingart | Dec. 24, | 1946 |
| 2,610,989 | Wiese et al. | Sept. 16, | 1952 |
| 2,681,566 | Ruge | June 22, | 1954 |
| 2,729,243 | Senn | Jan. 3, | 1956 |
| 2,755,668 | Meyer | July 24, | 1956 |
| 2,761,317 | Seagrave | Sept. 4, | 1956 |
| 2,788,664 | Coulbourn et al. | Apr. 16, | 1957 |